United States Patent [19]

Takekoshi et al.

[11] Patent Number: 4,766,199

[45] Date of Patent: Aug. 23, 1988

[54] SECONDARY AMINE-TERMINATED OLIGOMERS AND COPOLYURETHANECARBONATES PREPARED THEREFROM

[75] Inventors: Tohru Takekoshi, Scotia; Patricia P. Anderson, Albany, both of N.Y.

[73] Assignee: General Electric Company, Schenectady, N.Y.

[21] Appl. No.: 15,638

[22] Filed: Feb. 17, 1987

Related U.S. Application Data

[62] Division of Ser. No. 877,623, Jun. 23, 1986, Pat. No. 4,695,612.

[51] Int. Cl.$^4$ .................................................. C08G 8/02
[52] U.S. Cl. ............................. 528/128; 252/183.11; 528/125; 528/172; 528/175; 528/340; 528/348; 548/455; 548/457; 564/305; 564/328; 564/430

[58] Field of Search ................ 528/125, 172, 340, 175, 528/331, 348, 128; 252/188.31; 525/420, 471, 535

[56] References Cited

U.S. PATENT DOCUMENTS 4,611,048 9/1986 Peters .................................. 528/185

Primary Examiner—Theodore E. Pertilla
Attorney, Agent, or Firm—William H. Pittman; James C. Davis, Jr.; James Magee, Jr.

[57] ABSTRACT

Secondary amine-terminated aromatic oligomers are prepared by conventional reactions for the formation of such polymers as polyimides, polyethersulfones and polyetherketones, using such compounds as methylamino or phenylamino anilines or phenols as endcapping agents. The secondary amine-terminated oligomers may be reacted with cyclic polycarbonate oligomers to prepare copolyurethanecarbonates which are useful as engineering thermoplastics.

9 Claims, No Drawings

SECONDARY AMINE-TERMINATED OLIGOMERS AND COPOLYURETHANECARBONATES PREPARED THEREFROM

This application is a division of application Ser. No. 877,623 filed June 23, 1986, now U.S. Pat. No. 4,695,612 issued Sept. 22, 1987.

This invention relates to oligomeric compositions of matter and uses thereof. More particularly, it relates to secondary amine-terminated oligomers and the conversion thereof to novel block copolyurethanecarbonates.

Various block copolymers containing polycarbonate moieties are known in the art, being described in numerous U.S. patents. Such copolymers are frequently useful by reason of the combination therein of advantageous properties of the polycarbonate moieties and the moieties of the other block or blocks.

Various engineering thermoplastics, including polyimides, polyethersulfones and polyetherketones, are of value in specific in use applications. It would be of interest to combine the properties of these engineering thermoplastics and polycarbonates, in the manner noted hereinabove.

A principal object of the present invention, therefore, is to provide novel block copolycarbonates and intermediates therefor.

A further object is to provide novel oligomers which may be converted into copolycarbonates, and a method for such conversion.

Other objects will in part be obvious and will in part appear hereinafter.

In one of its aspects, the present invention is directed to compositions comprising secondary amine-terminated aromatic oligomers having the formula

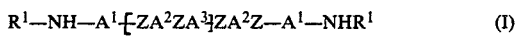

$$R^1-NH-A^1-[ZA^2ZA^3]_nZA^2Z-A^1-NHR^1 \quad (I)$$

wherein:
$R^1$ is $C_{1-4}$ alkyl or phenyl;
each of $A^1$, $A^2$ and $A^3$ is independently an aromatic radical, with $A^1$ and $A^3$ being divalent and $A^2$ being divalent or tetravalent;
Z is a bridging radical containing at least one non-carbon linking atom; and
n is from 0 to about 20.

The amine-terminated oligomers of this invention are characterized by structural units which may contain any known aromatic moieties. Examples of such moieties are given hereinafter. Aromatic structural units containing non-carbon linking atoms are included. The preferred oligomers are polyimides, polyethersulfones and polyetherketones.

The $R^1$ values in the amine-terminated oligomers are $C_{1-4}$ alkyl or phenyl radicals. The alkyl radicals include methyl, ethyl, 1-propyl, 2-propyl, 1-butyl, 2-butyl, isobutyl and t-butyl. The methyl and phenyl radicals are preferred, with methyl frequently being most preferred because of the particular suitable of the methylaminoterminated oligomers for conversion to copolycarbonates.

The $A^1$ values are divalent aromatic radicals, preferably hydrocarbon and substituted hydrocarbon radicals as illustrated by p-phenylene, m-phenylene, p-tolylene and chloro-, nitro- and acyl-substituted derivatives thereof. The aromatic hydrocarbon radicals, especially p-phenylene and m-phenylene, are preferred.

The $A^2$ values include aromatic hydrocarbon radicals and radicals containing non-hydrocarbon substituents and/or hetero atoms such as oxygen, nitrogen, sulfur, phosphorus and silicon. They may be divalent or tetravalent. For example, typical polyethersulfone and polyetherketone oligomers contain divalent $A^2$ radicals, while typical polyimides contain tetravalent $A^2$ radicals. Most often, $A^2$ contains a plurality of aromatic moieties separated by bridging groups such as alkylene, oxy, sulfone or carbonyl.

The preferred $A^2$ radicals are those having the formulas

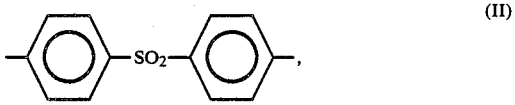

(II)

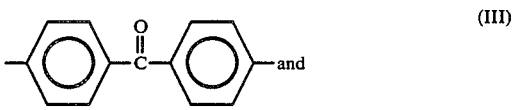

(III)

and

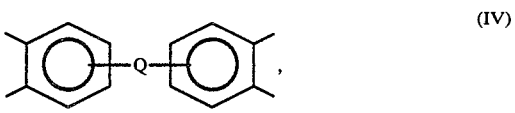

(IV)

wherein Q is a single bond or a divalent bridging group. The identity of the bridging group is immaterial so long as it does not substantially alter the character or reactivity of the $A^2$ moiety. Illustrative bridging groups are $-CH_2-$, $-C_2H_4-$, $-C(CH_3)_2-$, $-C(CF_3)_2-$, $-O-$,

$-S_x-$, $-SO_2-$, $-OR^2-O-$, $-S-R^2-S-$ and $-SO_2R^2-SO_2-$, wherein x is 1 or 2 and $R^2$ is a divalent aliphatic or aromatic radical, particularly a hydrocarbon radical.

The preferred bridging group is $-O-R^2-O-$, wherein $R^2$ is aromatic. Illustrative $R^2$ values are those having the formulas

(V)

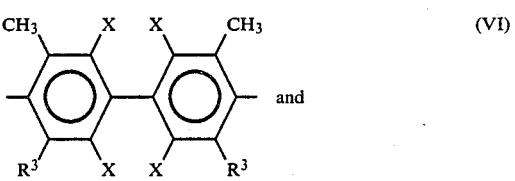

(VI)

and

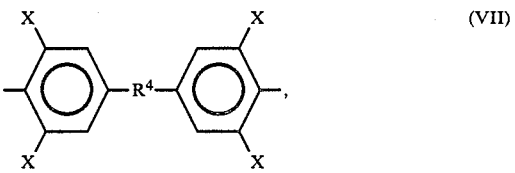

(VII)

wherein each $R^3$ is independently hydrogen or methyl; $R^4$ is a single bond, a straight chain or branched alkylene radical containing 1-5 carbon atoms, —O—, —S—, —SO$_2$—,

or —C(CF$_3$)$_2$— and is most often the isopropylidene radical; and each X is independently hydrogen or halogen (usually chlorine or bromine). Mixtures of the foregoing formulas are also contemplated. Especially preferred is the radical derived from bisphenol A [i.e., 2,2'-bis(4-hydroxyphenyl)propane] by the removal of both hydroxy groups therefrom and having formula VII wherein $R^4$ is isopropylidene and each X is hydrogen.

The $A^3$ values, like the $A^1$ values, are divalent aromatic radicals and usually aromatic hydrocarbon or substituted aromatic hydrocarbon radicals. Particularly preferred $A^3$ values are p-phenylene, m-phenylene and bis(4-phenylene)propane (i.e., the radical derived from bisphenol A).

The Z radicals are bridging radicals containing at least one non-carbon linking atom. They may be single atoms or combinations of atoms including nitrogen, oxygen and sulfur. They are preferably oxygen atoms (e.g., in polyethersulfones and polyetherketones) or have the formula

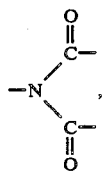

(VIII)

(e.g., in polyimides).

The value of n is from 0 to about 20, depending on the molecular weight of the amine-terminated oligomers of the invention. Most often, n is in the range of about 5-15.

The amine-terminated oligomers of this invention may be prepared by utilizing compounds of the formula $R^1$—NH—$A^1$—YH, wherein Y is O or NH, as endcapping agents in conventional condensation reactions for the preparation of aromatic polymers such as polyimides, polyethersulfones and polyetherketones. The condensation polymerization reactions are those known in the art. Thus, polyimides are typically prepared by the reaction of aromatic dianhydrides with aromatic diamines, and polyetherketones and polethersulfones by the reaction of bis-haloaryl ketones or sulfones with bisphenol salts.

Incorporation of compounds such as N-phenyl-p-phenylenediamine or N-methyl-p-phenylenediamine in a reaction mixture including a dianhydride and an aromatic diamine will produce a secondary amine-terminated oligomeric polyimide of this invention. Similarly, incorporation of such compounds as the alkali metal salts of p-hydroxy-N-methylaniline, p-hydroxydiphenylamine or the corresponding m-hydroxy compounds in a reaction mixture including a di-alkali metal salt of bisphenol A and bis(p-chlorophenyl) sulfone or 4,4'-dichlorobenzophenone will produce a secondary amineterminated polyethersulfone or polyetherketone of the invention. The proportion of endcapping agent may be determined conventionally, depending on the molecular weight desired for the oligomer. Most often, about 0.1-0.5 mole of endcapping agent is employed per mole of diamine or bisphenol salt. The conditions of the oligomer-forming reaction are otherwise conventional for the type of polymerization required.

The preparation of the secondary amine-terminated oligomers of this invention is illustrated by the following examples. Intrinsic viscosities were determined in chloroform at 25° C.

EXAMPLE 1

A mixture of 33.31 grams (64 mmol.) of 2,2-bis[4-(3,4-dicarboxyphenoxy)phenyl]propane dianhydride, 6.4884 grams (60 mmol.) of m-phenylenediamine, 1.4738 grams (8 mmol.) of N-phenyl-p-phenylenediamine, 8 mg. of sodium benzenephosphinate and 100 ml. of o-dichlorobenzene was heated under reflux in a nitrogen atmosphere, with stirring, for 1 hour. An additional 100 ml. of o-dichlorobenzene was added in two increments as water was removed by azeotropic distillation over 4 hours. The mixture was cooled and diluted with 300 ml. of methylene chloride, and the product was precipitated by pouring into methanol. There was obtained the desired phenylamino-terminated polyetherimide oligomer.

EXAMPLE 2

A mixture of 11.06 grams (139.1 mmol.) of a 50.26% aqueous sodium hydroxide solution, 14.29 grams (62.6 mmol.) of bisphenol A, 2.58 grams (13.91 mmol.) of m-hydroxydiphenylamine, 66 ml. of dimethyl sulfoxide and 60 ml. of toluene was heated under nitrogen, with stirring, as water was removed azeotropically. The refluxing toluene was continuously dried by recirculation through a bed of molecular sieve followed by calcium hydride.

After it was thoroughly dry, the mixture was cooled to room temperature in 19.97 grams (69.55 mmol.) of bis(p-chlorophenyl) sulfone was added. The mixture was heated for 11 hours at 122°-126° C., cooled and poured into water. The tacky precipitate which formed was isolated, washed with water, dried and dissolved in 400 ml. of tetrahydrofuran. The solution was filtered and precipitated by pouring into a mixture of 350 ml. of methanol and 10 ml. of acetic acid. Upon filtration, there was obtained the desired phenylamino-terminated polyethersulfone oligomer; it had an intrinsic viscosity in chloroform at 25° C. of 0.15 dl./g. and a number average molecular weight of about 2900.

EXAMPLE 3

The procedure of Example 2 was repeated, substituting p-hydroxy-N-methylaniline on an equimolar basis for the m-hydroxydiphenylamine. The resulting methylamino-terminated polyethersulfone oligomer had an intrinsic viscosity of 0.15 and a number average molecular weight of about 2000.

EXAMPLE 4

A mixture of 8.42 grams (105.7 mmol.) of 50.26% aqueous sodium hydroxide solution, 10.68 grams (47.55 mmol.) of bisphenol A, 1.96 grams (10.57 mmol.) of p-hydroxydiphenylamine, 47 ml. of dimethyl sulfoxide and 30 ml. of toluene was heated under reflux in a nitrogen atmosphere, with stirring, and was dehydrated as described in Example 2. The solution was cooled and 13.27 grams (52.85 mmol.) of 4,4'-dichlorobenzophenone and 30 ml. of dimethyl sulfoxide were added. The mixture was heated at 130° C. for 20 hours and the product was precipitated by pouring into methanol, redissolved in tetrahydrofuran and precipitated again by pouring into water. Upon filtration, there was obtained the desired phenylamino-substituted polyetherketone oligomer; it had an intrinsic viscosity of 0.13 and a number average molecular weight of about 1800.

The amine-terminated oligomers of this invention may be converted to block copolyurethanecarbonates by reaction with cyclic polycarbonate oligomers. Accordingly, other aspects of the invention are the method for such conversion and the resulting block copolyurethanecarbonates, comprising structural units having the formula

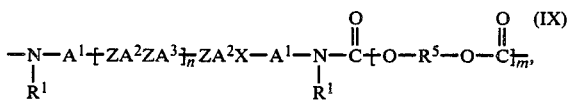

wherein $R^1$, $A^{1-3}$, Z and n are as previously defined, about 60% of the total number of $R^5$ radicals are aromatic organic radicals and the remainder are aliphatic, alicyclic or aromatic organic radicals, and m is in the range of about 10–500.

The cyclic polycarbonate oligomers useful in the method of this invention comprise structural units of the formula

wherein at least about 60% of the total number of $R^5$ values are divalent aromatic organic radicals, the balance thereof being aliphatic, alicyclic or aromatic organic radicals.

The $R^5$ values which are aliphatic or alicyclic generally contain up to about 8 carbon atoms. The $R^5$ values may contain substituents such as halo, nitro, alkoxy, lactone and the like. Most often, however, all $R^5$ radicals are hydrocarbon radicals.

Preferably at least about 80% of the total number of $R^5$ values in the cyclic oligomer mixtures, and most desirable all of said $R^5$ values, are aromatic. The aromatic $R^5$ radicals preferably have the formula

wherein each of $A^4$ and $A^5$ is a monocyclic divalent aromatic radical and Y is a bridging radical in which one or two atoms separate $A^4$ from $A^5$. The free valence bonds in formula XI are usually in the meta or para positions of $A^4$ and $A^5$ in relation to Y.

In formula XI, the $A^4$ and $A^5$ values may be unsubstituted phenylene or substituted derivations thereof, illustrative substituents (one or more) being alkyl, alkenyl, halo (especially chloro and/or bromo), nitro, alkoxy and the like. Unsubstituted phenylene radicals are preferred. Both $A^4$ and $A^5$ are preferably p-phenylene, although both may be o- or m-phenylene or one o- or m-phenylene and the other p-phenylene.

The bridging radical, Y, is one in which one or two atoms, preferably one, separate $A^4$ from $A^5$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^5$ values may be considered as being derived from dihydroxy compounds of the formula HO—$R^5$—OH, especially dihydroxyaromatic compounds and preferably bisphenols of the formula HO—$A^4$—$Y^1$—$A^5$—OH. The following dihydroxy compounds are illustrative:

Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene 1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Ethylene glycol bis(4-hydroxyphenyl) ether
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic polycarbonate oligomers include dimers, trimers and tetramers of the type disclosed in the following U.S. Pat. Nos.:
3,155,683
3,274,214
3,386,954
3,422,119.

Also included are cyclic polycarbonate oligomer mixtures of the type disclosed in European patent application No. 162,379 and in copending, commonly owned application Ser. No. 871,641 filed 6/6/86 the disclosures of which are incorporated by reference herein.

Such cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers are present. The mixtures also usually contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

These mixtures may be prepared by a condensation reaction involving at least one bishaloformate having the formula

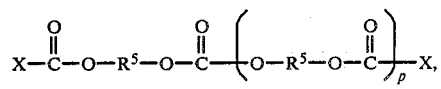

wherein $R^5$ is as defined hereinabove and X is chlorine or bromine. The condensation reaction typically takes place interfacially when a solution of said compound in a substantially non-polar organic liquid is contacted with a tertiary amine from a specific class and an aqueous alkali metal hydroxide solution. Also present may be other compounds, including oligomers of the formula $$X-\overset{O}{\underset{\|}{C}}-O-R^5-O-\overset{O}{\underset{\|}{C}}\left(-O-R^5-O-\overset{O}{\underset{\|}{C}}\right)_p-X,$$

wherein $R^5$ and X are as previously defined and p is a small number, typically about 1–4.

While the X values in formula XII may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid.

In addition to the bisphenol bischloroformate, such crude bischloroformate products may contain oligomer bischloroformates. Most often, a major proportion of the crude product comprises monomer, dimer and trimer bischloroformate. Higher oligomer bischloroformates, and monochloroformates corresponding to any of the aforementioned bischloroformates, may also be present, preferably only in trace amounts.

The tertiary amines useful for cyclic oligomer preparation ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Suitable aqueous alkali or alkaline earth metal hydroxide or carbonate solutions (hereinafter sometimes designated "metal base") include lithium, sodium, potassium or calcium hydroxide or sodium or potassium carbonate. Sodium hydroxide is preferred because of its availability and relatively low cost. The concentration of the solution is not critical and may be about 0.2-16 M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer, the reagents and components are maintained in contact under conditions whereby the bischloroformate is present in low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate, and optionally other reagents, are added gradually to a reaction vessel containing solvent.

The reaction temperature is generally in the range of about 0°-50° C. It is most often about 0°-40° C. and preferably 20°-40° C.

For maximization of the yield and purity of cyclic oligomers as opposed to high polymer and insoluble and/or intractable by-products, it is preferred to use not more than about 1.5 mole of bischloroformate per liter of organic liquid in the reaction system, including any liquid used to dissolve bischloroformate. Preferably, about 0.003-1.0 mole of bischloroformate is used.

The molar proportions of the reagents constitute another important feature for yield and purity maximization. The preferred molar ratio of amine to bischloroformate used alone (calculated as bisphenol bischloroformate) is about 0.1-1.0:1 and most often about 0.15-0.6:1, and that of metal base to bischloroformate is about 1.5-3:1 and most often about 2-3:1.

Separation of the oligomer mixture from at least a portion of the high polymer and insoluble material present is sometimes necessary or desirable. When other reagents are added to the metal base and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions described hereinafter are employed, the product may contain 10% or even less of such material. Depending on the intended use of the cyclic oligomer mixture, the separation step may then be unnecessary.

When such removal is necessary, it may be achieved by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The cyclic bisphenol A polycarbonate oligomer mixtures have been shown to contain oligomers having degrees of polymerization from 2 to 12, including substantially all of those from 2 to 6, with about 50-70% (by weight) thereof being in the range from 2 to 5. It is generally preferred to use said mixtures as prepared, or optionally with separation of high polymer and/or insolubles.

The preparation of cyclic oligomer mixtures is illustrated by the following examples. All parts and percentages in the examples herein are by weight unless otherwise indicated. Temperatures are in degrees Celsius. Molecular weights are weight average unless otherwise indicated and were determined by gel permeation chromatography relative to polystyrene.

EXAMPLES 5-22

Bisphenol A bischloroformate was reacted with aqueous sodium hydroxide and triethylamine in an organic liquid (chloroform in Example 11, methylene chloride in all other examples) according to the following procedure: The bischloroformate was dissolved in half the amount of organic liquid employed and was added gradually, with slow stirring, to the balance of the reaction mixture. In Examples 5-14 and 16, the triethylamine was all originally present in the reaction vessel; in Examples 18-20, it was added gradually at the same time as the bischloroformates; and in Examples 15, 17, 21 and 22, it was added in equal increments at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1 M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymer was precipitated by addition of acetone.

The reaction conditions for Examples 5-22 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE I

| Example | Bischloroformate amt., mmole/l. org. liquid | Bischloroformate amt., total mmol. | NaOH molarity | Molar ratio, amino:bischloroformate | Temperature | Addition time, min. | % oligomer in product |
|---|---|---|---|---|---|---|---|
| 5 | 100 | 2 | 0.313 | 0.5 | 20 | 30 | 97 |
| 6 | 100 | 2 | 0.625 | 0.5 | 20 | 30 | 95 |
| 7 | 100 | 2 | 2.5 | 0.5 | 35 | 55 | 93 |
| 8 | 100 | 2 | 2.5 | 0.5 | 0 | 30 | 77 |
| 9 | 100 | 2 | 2.5 | 0.5 | 20 | 30 | 87 |
| 10 | 100 | 2 | 2.5 | 0.5 | 35 | 30 | 78 |
| 11 | 100 | 2 | 2.5 | 0.5 | 50 | 30 | 88 |
| 12 | 100 | 2 | 2.5 | 0.25 | 20 | 30 | 74 |
| 13 | 100 | 1 | 2.5 | 0.2 | 20 | 15 | 75 |
| 14 | 200 | 4 | 2.5 | 0.5 | 20 | 30 | 88 |
| 15 | 500 | 10 | 2.5 | 0.25 | 25 | 105 | 83 |
| 16 | 500 | 10 | 2.5 | 0.25 | 25 | 105 | 78 |
| 17 | 500 | 10 | 2.5 | 0.25 | 25 | 105 | 83 |
| 18 | 500 | 10 | 2.5 | 0.25 | 25 | 105 | 87 |
| 19 | 500 | 10 | 2.5 | 0.29 | 30 | 90 | 78 |
| 20 | 500 | 10 | 2.5 | 0.25 | 30 | 20 | 75 |
| 21 | 500 | 10 | 2.5 | 0.25 | 40–45 | 105 | 79 |
| 22 | 500 | 10 | 2.5 | 0.4 | 25 | 105 | 79 |

EXAMPLE 23

Bisphenol A bischloroformate (2.0 mmol.) was reacted with aqueous sodium hydroxide and 4-dimethylaminopyridine in methylene chloride. The procedure employed was that of Example 5, except that 66.67 mmol. of bisphenol A per liter of methylene chloride was employed, the aqueous sodium hydroxide concentration was 5.0 M and the reaction temperature was about 25° C. The product comprised 85% cyclic oligomer.

EXAMPLE 24

A crude bisphenol A bischloroformate product was analyzed as follows:
Monomer bischloroformate: 58%
Dimer bischloroformate: 26%
Trimer bischloroformate: 10%
and had an average degree of polymerization of about 1.5. An amount thereof containing 800 mmol. of monomer and oligomer bischloroformates, calculated as monomer bischloroformate, dissolved in one-half the total amount of methylene chloride used, and 450 ml. of 5 M aqueous sodium hydroxide were added over 37 minutes, with stirring, to a reaction vessel containing the balance of the methylene chloride. The total amount of bischloroformate was 400 mmol. per liter of methylene chloride. Triethylamine, 200 mmol., was added in equal increments at intervals of 25% during bischloroformate addition. The peak reaction temperature was 37°. Upon workup as in Examples 5–22, there was obtained a product comprising 82% cyclic polycarbonate oligomer.

EXAMPLE 25

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9 M aqueous sodium hydroxide, 1.16 ml. of triethylamine and 5 ml. of 0.66 M aqueous disodium salt of bisphenol A. The mixture was heated under reflux, with stirring, as 40 ml. of the bischloroformate solution was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

For the preparation of the block copolyurethanecarbonates of this invention, at least one amine-terminated oligomer and the cyclic polycarbonate oligomer composition are heated at a temperature generally in the range of about 150°–325° C. The reaction may be conducted in the melt or in solution, typical solvents being relatively high boiling liquids such as chlorobenzene and o-dichlorobenzene.

The proportions of amine-terminated oligomer and cyclic polycarbonate oligomer composition are subject to wide variation, depending on the chain lengths of the blocks desired in the product. In general, the weight ratio of reactants may be from about 0.1:1 to about 10:1, preferably from about 0.5:1 to about 2:1.

The preparation of the block copolyurethanecarbonates of this invention is illustrated by the following examples.

EXAMPLE 26

A mixture of equal weights of a bisphenol A cyclic polycarbonate oligomer mixture similar to that of Example 25 and the phenylamino-terminated polyetherimide oligomer of Example 1 was heated on a glass plate under nitrogen at 280°–300° C. for 1 hour. Upon cooling, the desired block copolyurethanecarbonate was obtained as a tough yellow film which adhered strongly to the glass surface.

EXAMPLE 27

To a solution of 1 part of the phenylamine-terminated polyetherimide oligomer of Example 1 in 5 parts of hot o-dichlorobenzene was added 1 part of the bisphenol A cyclic polycarbonate oligomer of Example 26. The mixture was heated to 90° C., whereupon it became homogeneous. It was cast on a glass plate maintained at 150° C. and heating was continued until the solvent had evaporated. The resulting film was cured at 280°-300° C. for 1 hour and cooled, whereupon the desired copolyurethanecarbonate was obtained as a translucent tough yellow film.

EXAMPLE 28

A solution of 0.73 gram each of the methylaminoterminated polyethersulfone oligomer of Example 3 and the cyclic bisphenol A polycarbonate oligomer mixture of Example 27 in 4 ml. of methylene chloride was poured onto a glass plate and the methylene chloride was allowed to evaporate at 40°-75° C. The plate was heated to 300° C., maintained at that temperature for 1½ hours and cooled. The resulting block copolyurethanecaroonate was obtained as an amber film having a Tg of 159° C.

The copolyurethanecarbonates of this invention are useful as engineering thermoplastics in various applications. They are of particular value where the beneficial properties of polycarbonates in combination with those of polyimides, polyethersulfones or polyetherketones are desired; for example, in polycarbonate applications where high thermal stability and solvent resistance are required.

What is claimed is:

1. A composition comprising secondary amine-terminated aromatic oligomers having the formula $$R^1-NH-A^1+ZA^2ZA^3\}_nZA^2Z-A^1-NHR^1 \quad (I),$$

wherein:
R$^1$ is C$_{1-4}$ alkyl or phenyl;
each of A$^1$, A$^2$ and A$^3$ is independently an aromatic radical, with A$^1$ and A$^3$ being divalent and A$^2$ being divalent or tetravalent;
Z is a bridging radical containing at least one non-carbon linking atom; and
n is from 0 to about 20.

2. A composition according to claim 1 wherein A$^1$ is p-phenylene or m-phenylene, Z is oxygen or has the formula

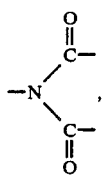  (VIII)

and A$^2$ has one of the formulas

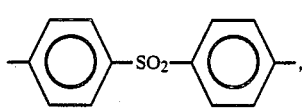  (II)

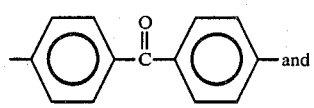  (III)

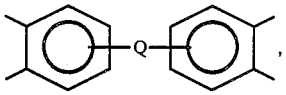  (IV)

wherein Q is a single bond or a divalent bridging group.

3. A composition according to claim 2 wherein R$^1$ is methyl or phenyl.

4. A composition according to claim 3 wherein Z has formula VIII, A$^2$ has formula IV and Q is —CH$_2$—, —C$_2$H$_4$—, —C(CH$_3$)$_2$—, —C(CF$_3$)$_2$—, —O—,

—S$_x$—, —SO$_2$—, —OR$^2$—O—, —S—R$^2$—S— or —SO$_2$R$^2$—SO$_2$—, wherein x is 1 or 2 and R$^2$ is a divalent aliphatic or aromatic radical.

5. A composition according to claim 4 wherein Q is —O—R$^2$—O— and R$^2$ has one of the formulas

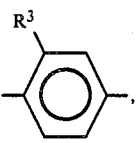  (V)

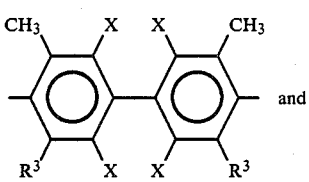  (VI)

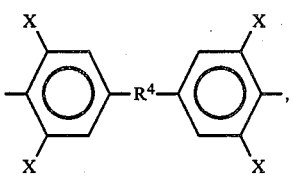  (VII)

wherein each R$^3$ is independently hydrogen of methyl; R$^4$ is a single bond, a straight chain or branched alkylene radical containing 1-5 carbon atoms, —O—, —S—, —SO$_2$—,

or —C(CF$_3$)$_2$—; and each X is independently hydrogen or halogen.

6. A composition according to claim 5 wherein A$^3$ is m-phenylene, R$^2$ has formula VII, R$^4$ is isopropylidene and each X is hydrogen.

7. A composition according to claim 3 wherein Z is oxygen and A$^3$ is the bis(4-phenylene)propane radical.

8. A composition according to claim 7 wherein A$^2$ has formula II.

9. A composition according to claim 7 wherein A$^2$ has formula III.

* * * * *